3,117,943
PIGMENTED VINYL POLYMERS PREPARED BY ADSORBING VINYL MONOMER ON CARBON BLACK AND THEN POLYMERIZING SAID MONOMER
Paul Jacques Corbiere and Jean Baptiste Rosset, Lyon, France, assignors to Crylor, Paris, France, a body corporate of France
No Drawing. Filed Dec. 1, 1958, Ser. No. 777,198
Claims priority, application France Dec. 5, 1957
5 Claims. (Cl. 260—41)

The invention relates to vinyl polymers pigmented with carbon black and which are suitable for the production of shaped articles and to processes for the production thereof.

It is known that commercial pigments generally have the form, after intensive crushing, of agglomerates of small grains. These agglomerates are often difficult to disintegrate, with the result that when the pigment is used for the production of shaped articles the distribution of the pigment is not sufficiently uniform.

It is a usual practice in order to improve the pigment distribution, in the production of synthetic textiles dyed in the mass, to use crushed pigments which are incorporated, during or after crushing, in plastic masses compatible with the material to be spun. The processes for the preparation of these coated pigments comprise at least one operation for crushing the base pigments, either by impact or by compression.

It is an object of the present invention to provide means for obtaining, without any pigment-crushing operation, carbon-black-pigmented vinyl polymer compositions which can be readily dispersed in solvents for the said polymers to yield compositions in which the carbon black is very finely dispersed.

According to the present invention a process for the preparation of a carbon-black-pigmented vinyl polymer composition comprises adsorbing at least one vinyl monomer on to carbon black and subjecting the product to polymerisation. Accordingly the polymerisation is effected in the presence of a liquid having a swelling action or solvent action on the polymer formed.

Further according to the present invention there are provided as new compositions of matter, obtainable by the aforesaid process, vinyl polymers having carbon black distributed therein in the form of grains of diameter less than 0.5μ.

By the expression "vinyl monomers" is meant the products derived from ethylene by substitution of one or more hydrogen atoms on one of the carbons by means of atoms or groups such as, more especially, halogens, nitrile groups, aliphatic or aromatic groups or acid groups.

Examples of vinyl monomers which can be used are vinyl acetate, acrylic and methacrylic acids and esters, and their derivatives such as acrylonitrile, methacrylonitrile and styrene.

The determination of the size of the grains is effected as follows:

A dispersion of the carbon-black pigmented vinyl polymer composition is prepared by dissolving the polymer in an appropriate solvent, in a concentration of 0.5 g. of composition per litre of solvent. This dispersion is projected by means of an atomiser on to supports for examination under the electron microscope. With a magnification of the order of ×7000 to ×15000, it is found that the commercial coated pigments form large aggregates (visible under the optical microscope), which are of very variable size, while in the case of products obtained in accordance with the present invention each granule is individually distinguished with a mean diameter between 500 and 1000 A. The observed preparation shows that almost all the carbon black is in the form of grains of a diameter less than 0.5μ.

For carrying out the present invention, the monomer or monomers are adsorbed on a carbon black in its commercial form without having to undergo any special crushing operation, the choice of the monomer or monomers depending on the solvent in which it is desired subsequently to disperse the product obtained, and the polymerisation is then effected in the usual way as a bulk, emulsion or solution polymerisation.

The adsorption of the monomer or monomers on the carbon black may be previously effected, or it may be effected by introducing the carbon black into a mixture of monomer and solvent. In order to effect a regular adsorption of the monomer or monomers by the carbon black, the operation may be carried out in the gaseous or liquid phase, by simple agitation or by means of any appropriate apparatus. This adsorption may be carried out under a nitrogen atmosphere and if necessary after degassing of the carbon black in vacuo. It is recommended for obtaining the optimum result that each grain of carbon black should have adsorbed the monomer or monomers in the same degree.

The polymerisation is thereafter effected in a known manner as a bulk, solution or emulsion polymerisation. For solution polymerisation, there may be employed, for example, diethyl ether, carbon tetrachloride, chloroform, methylene chloride, dioxan, glycol formal, alcohols such as methanol, ethanol and isopropanol, ketones such as acetone and methylethyl ketone, benzene and glacial acetic acid.

The quantity of carbon black employed may vary within wide limits depending upon the subsequent use for which the final composition is intended. It is generally desirable that the quantity of monomer ploymerised in situ be at least equal to 10% of the final pigment. Contents of from 20% to 70% are generally recommendable.

It is particularly surprising that it is possible to effect such a polymerisation in the presence of carbon black, since it is known, on the one hand, that the latter possesses a marked radical character and thus tends to inhibit the polymerisation of the vinyl compounds [Comptes-rendus de l'Academie des Sciences, vol. 246 (1958), pages 3230–3232 and 3341–3344] and on the other hand that the polymerisation of vinyl monomers is more difficult when it is carried out in the presence of a liquid which has a swelling or solvent action for the polymers being formed.

Depending upon the particular conditions of polymerisation, the products obtained may, in contrast to the commercial products at present known, take the form of extremely light fine powders, the apparent density of which may be excessively low, for example between 0.100 and 0.400. If desired, they may be agglomerated by any method, such as, for example, by compression or tabletting, which increases their density without impairing their dispersing capacity.

The product obtained after polymerisation of one or more vinyl polymers in the presence of carbon black as hereinbefore described may, if desired, undergo a treatment which modifies the solubility of the polymer, so that it is possible to obtain, from one and the same polymer, compositions which can be dispersed either in solvents for the direct polymer or in solvents for the modified polymer. Treatments of this nature are, for example, saponification and hydrolysis.

The products of the invention may thereafter be employed, without any crushing operation for the production of shaped articles which are carbon-black-pigmented in the mass, for example, by extrusion of fine dispersions of these products alone or in mixture with other materials in liquids which are solvents both for the polymer and for such other materials, to form synthetic textiles.

The following examples, in which the parts are by weight, will serve to illustrate the invention:

Example I 20 parts of carbon black are introduced into a mixture containing:

|   | Parts |
|---|---|
| Acrylonitrile | 40 |
| Methanol | 40 |

The mixture is agitated for 72 hours. The adsorption of the monomer by the carbon is manifested by a thickening of the mixture. There are thereafter added, as catalysts:

|   | Parts |
|---|---|
| Azo-di-isobutyronitrile | 0.4 |
| Oxalic acid | 0.8 |

The mass obtained is heated for 16 hours under reflux (75° C.) and the operation terminated by a dry distillation to eliminate the solvent. The product obtained contains 36.2% of carbon black. Its apparent density is 0.269. It disperses very readily in dimethylformamide to give dispersions, observation of which under the electron microscope shows that almost all the carbon black is in the form of grains of a diameter of less than $0.5\mu$.

Example II 20 parts of carbon black are introduced into a mixture containing:

|   | Parts |
|---|---|
| Acrylonitrile | 40 |
| Acetic acid | 40 |

The mixture is agitated for 24 hours. The same catalysts are added as in Example I, and the mixture is polymerised under reflux for 1 hour. The operation is completed by washing with acetone followed by drying of the polymer. The product obtained contains 38.1% of the carbon black. Its apparent density is 0.258. It disperses to form a very fine dispersion in dimethyl formamide and observation under the electron microscope shows that almost all of the carbon black is in the form of grains of a diameter of less than $0.4\mu$. The product, without intermediate crushing, in admixture with an uncoloured polyacrylonitrile, so that the pigment content of the polymer mixture is 4%, is thereafter used for spinning to form filaments. The spinning gives excellent results, and a very evenly coloured filament is obtained.

Example III

A mixture is prepared containing:

|   | Parts |
|---|---|
| Acrylonitrile | 24.5 |
| Acrylic acid | 0.5 |
| Methanol | 65 |
| Carbon black (apparent density 0.080) | 10 |

There are then added:

|   | Part |
|---|---|
| Azo-di-isobutyronitrile | 0.25 |
| Oxalic acid | 0.5 |

The mixture obtained is subjected to agitation at 100 r.p.m. for 2 hours with circulation of a current of nitrogen. The polymerisation is then effected by heating under reflux for 17 hours under a nitrogen atmosphere, and the operation is completed by drying in vacuo at 90° C. The product obtained contains 46% of carbon black. The dispersion of the pigment is excellent and its apparent density is 0.100.

The product is introduced into a tabletting machine and it is found that, up to an apparent density of 1.100, the tablets obtained give, on simple agitation in dimethylformamide, dispersions which are as fine as those obtained from the initial product and much finer than those of the commercial coated products currently obtainable. Examination under the electron microscope shows that about 98% of the carbon grains have a diameter of less than $0.15\mu$.

Example IV

The process of Example III is repeated but the polymerisation period is increased to 24 hours. The product obtained contains 44% of carbon black and disperses very well in dimethylformamide. Observation of the dispersion under the electron microscope shows that almost all the product is in the form of grains of a diameter of less than $0.2\mu$. When used in admixture with uncoloured polyacrylonitrile for spinning to form filaments, this product gives excellent results both from the standpoint of the actual spinning operation and from the standpoint of the quality of the filaments obtained.

Example V 2.5 parts of carbon black are introduced into a fluid-tight polymeriser. A vacuum of up to 20 mm. Hg. is established in the apparatus. The vacuum is maintained for 1 hour in order to de-gas the carbon black. Nitrogen is introduced under normal pressure to drive off all the oxygen. A further vacuum is formed and there is introduced in vacuo a solution containing:

|   | Parts |
|---|---|
| Acrylonitrile | 6.25 |
| Methanol | 16.25 |
| Azo-di-isobutyronitrile | 0.0625 |
| Oxalic acid | 0.125 |

The mixture is agitated at 100 r.p.m. There is thus obtained a very intimate and rapid wetting of the carbon black by the acrylonitrile. After half an hour, the mixture is polymerised by heating under reflux with a circulation of nitrogen for 17 hours. A dry distillation is thereafter effected in order to eliminate the methanol and the residual monomer, and there is obtained a product containing 69% of carbon black. Despite the very high carbon black content, the dispersion of the latter is excellent, almost all of the carbon grains, observed under the electron microscope, having a diameter of less than $0.5\mu$.

Example VI

There is prepared a mixture containing:

|   | Parts |
|---|---|
| Acrylonitrile | 23.25 |
| Methyl methacrylate | 1.75 |
| Carbon black | 15 |

The mixture obtained is subjected to agitation at 60 r.p.m. for 2 hours with a circulation of nitrogen.

There are then added:

|   | Parts |
|---|---|
| Methanol | 60 |
| Azo-di-isobutyronitrile | 0.5 |
| Oxalic acid | 0.5 |

The polymerisation is thereafter effected by heating under reflux for 17 hours under a nitrogen atmosphere. The operation is completed by a dry distillation, whereby a product containing 45.5% of carbon black is obtained. The dispersion of this product in dimethylformamide is excellent. Observation of the dispersion under the electron microscope shows that almost all of the carbon black is in the form of individual grains having a diameter of less than $0.3\mu$.

Example VII

Acrylonitrile is adsorbed in the vapour phase by carbon black, which is thereafter mixed with methanol, and the mixture is adjusted to the following composition:

|   | Parts |
|---|---|
| Acrylonitrile | 5 |
| Methanol | 75 |
| Carbon black | 20 |

There are then added:

| | Part |
|---|---|
| Azo-diisobutyronitrile | 0.05 |
| Oxalic acid | 0.10 |

The mixture obtained is subjected to agitation at 80 r.p.m. for 2 hours with circulation of nitrogen, and the polymerisation is then effected by heating under reflux for 17 hours under a nitrogen atmosphere. The operation is completed by a dry distillation, whereby a product containing 89.5% of carbon black is obtained. The dispersion of the product in dimethylformamide is excellent. Observation of the dispersion under the electron microscope shows that almost all of the carbon black is in the form of grains of a diameter less than $0.5\mu$.

*Example VIII*

There are mixed at room temperature:

2.5 parts of carbon black having an apparent density of 0.080
6.25 parts of acrylonitrile
16.25 parts of methanol
0.125 part of oxalic acid
0.0625 part of azo-diisobutyronitrile When the mixture is homogeneous, it is introduced into a polymerization apparatus having no agitating means, but provided with a reflux device and a device for adjusting the temperature. The air is displaced by means of nitrogen and the mixture is progressively heated until polymerization commences. From this instant, the temperature is maintained constant as long as this polymerisation continues. When the polymerization is complete, which takes between 15 and 20 hours, the apparatus is exhausted to low presure and the solvent is driven off by dry distillation without agitation.

A product is obtained which consists of:

| | |
|---|---|
| Carbon black | 55% |
| Polymerised acrylonitrile | 45% |

This product has an apparent density of 0.500, and disperses extremely rapidly in dimethylformamide. On examination under the electron microscope it is found to contain very fine elemental grains of carbon black, of which 99% have a diameter less than $0.2\mu$.

*Example IX*

There are mixed at room temperature:

| | Parts |
|---|---|
| Carbon black (apparent density of 0.080) | 12 |
| Acrylonitrile | 34.4 |
| Acrylic acid | 0.6 |
| Methanol | 47 |
| Sulphuric acid (40 g./litre) | 0.24 |

The mixture is introduced into a thermally insulated polymerization apparatus. A current of nitrogen is passed therethrough at a rate of 100 litres per hour throughout the operation and the mixture is agitated at 30 r.p.m.

There are successively added:

| | Parts |
|---|---|
| Sodium bisulphite solution (36° Bé.) | 2.6 |
| Potassium chlorate | 0.35 |
| Distilled water | 6 |

The agitation is continued throughout the duration of the operation, which lasts about 1 hour. The nitrogen circulation is stopped and there is obtained, after evaporation of the solvents, a product containing 52% of carbon black and 48% of polymer, and having an apparent density of 0.750. It disperses extremely readily in dimethylformamide and is found, on examination under the electron microscope, to contain very fine elemental grains of carbon black, of which 96% have a diameter smaller than $0.2\mu$.

*Example X*

There are mixed:

| | Parts |
|---|---|
| Vinyl acetate | 154 |
| Carbon black | 20 |

This mixture is agitated for 2 hours at room temperature, and there are then added:

| | Parts |
|---|---|
| Azo-diisobutyronitrile | 0.18 |
| Dissolved in vinyl acetate | 26 |

The mixture is heated at 75° C. with a circulation of nitrogen. After half an hour, the distillation is commenced and it is continued for 4 hours at normal pressure until dryness is reached. The drying is finished in vacuo.

There is obtained a composition containing 19.5% of carbon black which disperses very well in acetone or ethyl acetate. These dispersions, when examined under the electron microscope, show that almost all of the carbon grains have a diameter smaller than $0.5\mu$.

*Example XI*

There are mixed:

| | Parts |
|---|---|
| Carbon black | 216 |
| Vinyl acetate | 1384 |

The mixture is agitated at 25° C. in a circulated current of nitrogen for 2 hours to obtain a good wetting of the carbon black by the vinyl acetate.

There are then added:

| | Parts |
|---|---|
| Azo-diisobutyronitrile | 7.92 |
| Dissolved in vinyl acetate | 200 |

The mixture is agitated for half an hour at 25° C. with a circulation of nitrogen and thereafter heated at 75° C. on the water bath for seven hours, while the agitation is maintained and the excess of monomer is distilled off. The mean distillation speed is 150 parts per hour. Finally, the product is dried in vacuo at 60° C. to constant weight. The composition obtained contains 43.5% of carbon black and disperses very rapidly in cyclohexanone or dioxan. Its dispersion is excellent. Observation under the electron microscope shows that almost all of the carbon grains have a diameter smaller than $0.5\mu$.

The composition thus obtained is directly introduced, in a proportion of 3%, into a solution of cellulose acetate in acetone at convenient spinning concentration. The mixture is malaxated for 8 hours. The filter ability of the composition obtained is identical with that of the composition not charged with pigment while, when an ordinary mechanically dispersed carbon black is similarly employed, the filterability of the resulting composition is greatly reduced. The mechanical properties of the black filaments thus obtained are identical with those of the unpigmented filaments.

*Example XII*

There are mixed:

| | Parts |
|---|---|
| Carbon black | 36 |
| Methyl methacrylate | 90 |
| Methanol | 124 |

The mixture is agitated for 2½ hours at room temperature in a circulating current of nitrogen, and there are then added:

| | Parts |
|---|---|
| Azo-diisobutyronitrile | 1.8 |
| Methanol | 50 |

After mixing for 15 minutes, the mass is heated under reflux (75° C.) for 18 hours. The product is distilled to dryness, the drying being finished in vacuo. The composition contains 29.5% of carbon black and disperses very readily in dimethylformamide or other solvents for methyl methacrylate polymer. Examination of these dispersions under the electron microscope shows that almost all of the carbon grains have a diameter smaller than 0.5µ.

EXAMPLE XIII

There are mixed:

| | Parts |
|---|---|
| Carbon black | 36 |
| Methyl acrylate | 60 |
| Methanol | 186 |

The mixture is agitated at room temperature under a circulating current of nitrogen for 1 hour, and there are then added:

| | Parts |
|---|---|
| Sodium bisulphite (concentrated solution) | 2 |

The mixture is agitated for a further hour and there are added:

| | Parts |
|---|---|
| Potassium chlorate | 0.6 |
| In solution in water | 18 |

The agitation is continued. Since the polymerisation is exothermic, the temperature reaches 69° C. after 20 minutes. This temperature is maintained for 2 hours by an auxiliary heating means. The methanol is allowed to separate and is eliminated by decantation. Dimethylformamide is added to dissolve the polymerised mass. The first fractions distilling up to 100° C. are eliminated, these fractions containing a mixture of methanol and methyl acrylate. The plastic mass obtained is precipitated from boiling water, washed and dried.

The methyl acrylate yield from the polymerisation is 53.5%. The composition obtained contains 52.9% of carbon black and disperses very readily in solvents for the polymer, such as dioxan and dimethylformamide. Examination of these dispersions under the electron microscope shows that almost all of the carbon grains have a diameter smaller than 0.5µ.

*Example XIV*

There are mixed:

| | Parts |
|---|---|
| Carbon black | 36 |
| Methyl methacrylate | 45 |
| Methanol | 169 |

The mixture is agitated for 2 hours at room temperature under a circulating current of nitrogen, and there are then added:

| | Parts |
|---|---|
| Azo-diisobutyronitrile | 0.9 |
| Dissolved in methanol | 50 |

The mixture is heated under reflux (75° C.) with agitation and under nitrogen for 46 hours and distilled to dryness, and finally dried in vacuo.

The composition obtained contains 47.5% of carbon black and disperses very well in dioxan and dimethylformamide. Examination of these dispersions under the electron microscope shows that almost all of the carbon grains have a diameter of less than 0.5µ.

*Example XV*

There are mixed:

| | Parts |
|---|---|
| Carbon black | 36 |
| Methyl acrylate | 90 |
| Methanol | 124 |

The mixture is agitated at room temperature under a nitrogen circulation for 2½ hours, and there is then added:

| | Parts |
|---|---|
| Azo-diisobutyronitrile | 1.8 |
| Methanol | 50 |

The mass is mixed for 15 minutes and then heated under reflux under nitrogen for 18 hours. The product is then distilled to dryness, the drying being finished in vacuo.

The composition obtained contains 30.2% of carbon black and disperses very well in acetone and cyclohexanone. When examined under the electron microscope, these dispersions show that almost all of the carbon grains have a diameter of less than 0.5µ.

*Example XVI*

There are mixed:

| | Parts |
|---|---|
| Carbon black | 36 |
| Styrene | 90 |
| Benzene | 124 |

The mixture is agitated at room temperature under a circulation of nitrogen for 2½ hours, and there are then added:

| | Parts |
|---|---|
| Azo-diisobutyronitrile | 1.8 |
| Benzene | 50 |

The mixture is heated under reflux on the water bath at 95° C. with agitation under nitrogen for 20 hours.

After polymerization, the plastic mass obtained is precipitated from methanol, washed and dried for 20 hours at 80° C.

The composition obtained contains 48.5% of carbon black and disperses very well in dimethylformamide, benzene, toluene, xylene, dioxan and carbon tetrachloride. Examination of these dispersions under the electron microscope shows that almost all of the carbon grains have a diameter smaller than 0.5µ.

*Example XVII*

There are mixed:

| | Parts |
|---|---|
| Carbon black | 36 |
| Methyl acrylate | 60 |
| Methanol | 186 |

This mixture is agitated for one hour at room temperature under a circulation of nitrogen, and there are then added:

| | Parts |
|---|---|
| Sodium bisulphite (concentrated solution) | 2 |

After agitation for one hour, there are added:

| | Parts |
|---|---|
| Potassium chlorate | 0.6 |
| Dissolved in water | 18 |

The agitation is continued for 15 minutes under nitrogen and then stopped. The reaction is exothermic and the temperature rises to 69° C. This temperature is maintained for 2 hours. The methanol is allowed to separate and is decanted and dimethylformamide is then added to dissolve the polymerised mass.

The first fractions distilling up to 100° C. and containing methanol and methyl acrylate are eliminated. The plastic mass obtained is thereafter precipitated from boiling water and then washed and dried.

The composition obtained contains 51.5% of carbon black and disperses very well in acetone, ethyl acetate and dimethylformamide. Examination of these dispersions under the electron microscope shows that almost all of the carbon grains have a diameter of less than 0.5µ.

*Example XVIII*

To one part of the composition obtained in Example XI are added 30 parts of a N/2 potassium hydroxide solution in methanol.

The mixture is heated under reflux for 1½ hours and then washed with methanol and dried.

The product obtained is dispersed in water and then heated for 30 minutes at 80° C. A very fine carbon black dispersion is obtained, almost all of which is found to consist of carbon black grains of a diameter less than 0.5μ.

We claim:

1. A process for the production of a composition consisting substantially of vinyl polymer and carbon black, which comprises adsorbing on to carbon black a polymerizable monomer from the group consisting of (a) carboxylic acids, esters, and nitriles, said compounds containing a

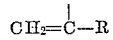

group in which R is selected from the group consisting of hydrogen and the methyl group, and (b) styrene, from a homogeneous liquid phase comprising at least one of said monomers and thereafter polymerizing said monomer and isolating the product, the carbon black being present in a proportion of at least 10% of the total weight of carbon black and said monomer.

2. A process according to claim 1 wherein the homogeneous liquid phase consists substantially of the said monomer alone.

3. A process according to claim 1 wherein the homogeneous liquid phase consists substantially of the said monomer dissolved in a liquid organic solvent.

4. A process according to claim 1 comprising using vinyl acetate as the said monomer and after polymerization subjecting the polymerized product to hydrolysis and then washing and drying it.

5. The composition of matter, consisting substantially of a vinyl polymer and carbon black, produced by the process of claim 1.

References Cited in the file of this patent
UNITED STATES PATENTS

| | | |
|---|---|---|
| 2,489,226 | Morris et al. | Nov. 22, 1949 |
| 2,500,023 | Burk | Mar. 7, 1950 |
| 2,512,697 | Te Grotenhuis | June 27, 1950 |
| 2,876,133 | Iler et al. | Mar. 3, 1959 |